United States Patent Office 3,799,886
Patented Mar. 26, 1974

3,799,886
CATALYSTS FOR THE MANUFACTURE OF
PHTHALIC ANHYDRIDE
Klaus Felice, Donaustauf, Josef Sedlmeier, Munich, Walter Gierer, Regensburg, Werner Frey, Munich, and Otto Wiedemann, Munich-Geiselgasteig, Germany, assignors to Wacker-Chemie G.m.b.H., Munich, Germany
No Drawing. Filed Jan. 24, 1972, Ser. No. 220,401
Claims priority, application Germany, Feb. 12, 1971,
P 21 06 796.9
Int. Cl. B01j 11/06
U.S. Cl. 252—461                   2 Claims

ABSTRACT OF THE DISCLOSURE

A catalyst for use in manufacturing phthalic anhydride consisting of a carrier coated with a coating of vanadium pentoxide and titanium dioxide, which after a 5-hour tempering period at 400° C. has a BET surface of 15–100 sq. m./g.

BACKGROUND OF THE INVENTION

Catalysts for use in producing phthalic anhydride, consisting of carrier bodies coated with vanadium pentoxide and titanium dioxide, have been known for a long time. Production can be handled in accordance with Dutch Pat. No. 64,720, for instance, in such a manner that an aqueous solution or a suspension of titanyl sulfate is precipitated hot with a saturated solution of ammonium metavanadate, and the precipitate is coated onto the carrier body in a coating drum. During the subsequent calcining the precipitate is transformed into a mixture of vanadium pentoxide and titanium dioxide (anatase). The catalysts made in this manner are effective at saline bath temperatures of 300–340° C., but initially they cause a high total oxidation.

Another method of producing such catalysts is described in U.S. Pats. No. 2,035,606 and 2,625,554. Here, for instance, a heated carrier body is sprayed with a suspension of vanadium pentoxide and titanium dioxide. Using commercial anatase one obtains catalysts which even at saline bath temperatures of 400° C. and more require about two weeks until they yield a sufficiently pure phthalic anhydride.

Therefore, Belgian Pat. No. 721,850 suggests to add to the catalysts made with anatase compounds of aluminum, lithium or zirconium. However, these additives have not been successful because they do not improve the quality of the product. German published application No. 1,935,008 describes a method for purifying raw products obtained in such a manner. There the impure anhydride is carried once again at an elevated temperature, together with air, through a vanadium pentoxide-titanium dioxide catalyst.

The subject of the present invention is carrier catalysts for producing phthalic anhydride with a coating of vanadium pentoxide and titanium dioxide which after a 5-hour tempering at 400° C. shows a BET surface of 15–100 sq. m./g., preferably 25–50 sq. m./g.

According to the data contained in French Pat. No. 1,539,361 one should expect, when using catalysts of titanium dioxide and vanadium pentoxide with a large surface without the addition of potassium pyrosulfate, which has a moderating effect, a complete oxidation of the organic starting materials into carbon oxides and water, instead of an oxidation to phthalic acid anhydride. Contrary to this it has been established that with the carrier catalysts claimed here excellent yields and several additional advantages are obtained.

Even during start-up of the plant the quality of the separated phthalic anhydride is good. The minimum starting temperature characteristic for the inception of the exothermic reaction is lower by 20–50° C. than when the usual anatase is used. Thus in case of prolonged repairs the somewhat cooled-off reaction furnaces can be started up more easily. Also favorable is the behavior at varying loads of the reactors which may become necessary, for instance, in case of operational troubles, because no important yield reductions will occur during such periods. It should finally be mentioned that the sensitivity against poisoning of the catalyst by contamination with rust is lower.

We have discovered that these advantages can be achieved only if a catalyst coating is used whose BET surface after a 5-hour tempering at 400° C. shows 15–100 sq. m./g. The suitability of the catalyst is determined from a sample which is tempered as described. The catalyst need not be subjected to this treatment.

The BET surface of the catalyst coating is essentially determined by the titanium dioxide used. Therefore the selection of the titanium dioxide used is of decisive importance.

Commercial anatase is manufactured on a large scale as a pigment with a BET surface of 7–11 sq. m./g. and a particle size of 0.1–0.14 µm. by annealing freshly precipitated water-containing titanium dioxide, also called titanium dioxide-hydrate, at 800° C. The hydrate has a very large surface which even after tempering at 400° C. is still above 100 sq. m./g. Anatase as well as titanium dioxide-hydrate by themselves are not suitable as catalyst components for the carrier catalysts of the present invention. However, it has been established that carrier catalysts whose coating contains a mixture of anatase (BET surface 7–11 sq. m./g.) and titanium dioxide-hydrate (BET surface >100 sq. m./g.) are particularly suitable. The coatings in the main have pore radii (measured with the mercury porosimeter) between 500 and 2500 A., particularly between 1000 and 1300 A. The preferred proportion of anatase and titanium dioxide-hydrate, referred to grams of titanium dioxide, contained is from 1:1 to 4:1. The titanium dioxide-hydrate can be added entirely or in part also in the form of mixed precipitations with vanadium pentoxide. Anatase as well as titanium dioxide-hydrate are easily available commercially highly pure and of uniform quality. This is of great importance for the quality of the catalyst coatings.

On principle it is possible to use for titanium dioxide anatase which was not annealed at 800° C., but at about 550° C. There one obtains a product with BET surfaces of 70 sq. m./g. for instance. It is strange, however, that in case of surfaces being equal better results were obtained with mixtures of anatase and titanium dioxide-hydrate. It is also possible to produce suitable titanium dioxide by hydrolysis of titanium tetrachloride in the vapor phase.

The atomic proportion of titanium to vanadium and the thickness of the coating can be selected in accordance with the known state of the art. The above Dutch Pat. No. 64,720 for instance describes catalysts with a proportion of 1.1:1 to 5:1 and a coating quantity of 30 to 80 g. per liter of carrier body. Vanadium pentoxide can be used as such or in the form of compounds which, like for instance ammonium metavanadate, are transformed into vanadium pentoxide at a higher temperature. The specific surface of vanadium pentoxide which was tempered at 400° C. is so small that the form of the additive is not important.

Vanadium pentoxide can also be used in the form of mixed precipitations with titanium dioxide. Mixed precipitations in accordance with the above Dutch patent or variants of the precipitation process, when the precipitates are carefully rinsed, yield products whose surface amounts to considerably more than 100 sq.m./g. A reduction to the size required for producing good catalysts can be achieved by suitable temperature treatment and grinding. For joint precipitation one can start with commercial titanyl sulfate or with sulfuric acid solutions which, for instance, are produced commercially from highly purified titanium dioxide-hydrate for obtaining rutile seeds. The precipitation is performed in the acid region, preferably at a pH value of 2–4.

Useable carrier bodies are, according to the state of the art, spheres, cylinders and similar bodies of the approximate size of a pea, of aluminum oxide, silicon dioxide, corundum, earthenware, china, pumice or other silicates such as magnesium silicate. In accordance with the literature, the surface of the carrier bodies should be as small as possible. It has been established that for tubes with an inside diameter of 25 mm. used in most reaction furnaces spheres of 8 mm. are particularly suitable because while making good use of the space they cause only a small reduction in pressure and the tendency to packing faults during filling is minimized. For these carrier bodies a coating quantity of 30 to 50 g. per liter and a proportion of titanium to vanadium of 4 to 5:1 has been found to be particularly favorable.

One obtains carrier catalysts with very well adhering titanium dioxide-vanadium pentoxide coatings, which is of special importance for shipment and for filling the catalysts into the reaction tubes, when one adds an organic binding agent to the coating suspension, as is already known. Here the disadvantages described in Chem. Ing. Techn. 41, 968 for such additives, like reduction of yield, do not occur.

Particularly suitable organic binding agents are the commercially available and highly-filler-tolerant copolymer dispersions on the basis of styrene-acrylate, vinyl acetate-vinyl laurate, vinyl acetate-ethylene or vinyl acetate-maleinate. Additions in quantities of 10 to 25% by weight of synthetic resin, referred to the inorganic coating substance, are quite sufficient. The synthetic resin is burned out completely during heating of the reaction furnaces with hot air. The consequent loosening of the structure recedes after some time by itself and has no unfavorable consequences for the life of the catalysts.

The application of the coating onto the carrier bodies can be done with all customary equipment available. For instance, one can spray an aqueous suspension of the components onto the carrier bodies agitated and heated in a coating drum in such a manner that the water evaporates immediately upon hitting them. The coating can be accomplished in a particularly simple manner with fluidized bed coaters as described, for instance, in German Patent No. 1,280,756. With suspensions without organic binding agents coating temperatures above 150° C. are favorable. In case of adding synthetic resin dispersions one must take into account the film formation and film properties. Useable temperatures are in the region from 70–130° C. (exact measurement is difficult). The catalysts are especially suitable for the oxidation of o-xylene into phthalic anhydride. The usual reaction furnaces and reaction conditions can be used. Depending on the BET surface and load, the favorable saline bath temperature is between 350 and 410° C. Since the surface is reduced during operation, these temperatures are shifted somewhat upwards as time goes by. As a normal load one can consider about 4 normal cubic meters of air and 168 g. o-xylene per tube (length 3 m., inside diameter 25 mm.) per hour. Changes ranging from 2–5 normal cubic meters and 100 to 180 g. o-xylene can be carried out without impairing the yield and the quality of the product. The known addition of sulfur to o-xylene or of sulfur dioxide to the reaction gas is not absolutely necessary, but it results in yields higher by 1 to 2%. The usual quantities are for instance 0.05–0.3% sulfur in o-xylene or the corresponding quantity of sulfur dioxide to the reaction gas.

All tests described in the examples below were carried out in reaction furnaces with tubes 3 m. long and an inside diameter of 25 mm. The tubes were filled up to a height of 260 cm. with 8 mm. catalyst balls of low-porosity magnesium silicate (the same results are achieved with corundum, earthenware and china). In each case the temperature data refer to the salt bath, because determining the contact temperature is subject to considerable errors. The load was 4 normal cubic meters of air and 176 g. o-xylene per tube per hour. The o-xylene used was of 95.7% purity and contained 0.1% dissolved sulfur. The yield was determined by measuring the volume of the o-xylene consumed and weighing the phthalic anhydride separated. The percentages shown mean kg. of phthalic anhydride separated per 100 kg. of raw o-xylene consumed. All other percentages are percentages by weight.

The coating of the carrier bodies was accomplished in a coating drum at 70–90° C. with an aqueous suspension which contained per liter of water 450 g. vanadium pentoxide-titanium dioxide and 110 g. of a vinyl acetate-vinyl laurate-copolymer dispersion (solids content 50%). The quantities of coating components actually used are stated in grams per liter of carrier balls. Anatase without specific reference means anatase with 7–11 sq. m./g. surface. For titanium dioxide-hydrate the data refers to the $TiO_2$ contained therein. To determine the BET surface the coated balls were heated in an air stream by increments of 100° C. per hour to 400° C. and then kept at that temperature for 5 hours. The stated values for BET surface refer to a BET surface in sq.m./g. for the coating substance.

EXAMPLE 1

Catalyst: 9 g. $V_2O_5$, 18 g. anatase, 18 g. titanium dioxide-hydrate, BET surface: 72–79. Various production batches were examined in a 200-tube furnace, a 10-tube furnace and several one-tube furnaces during periods of up to 10 months. The minimum starting temperature lay between 330–340° C. At a starting temperature of 360° C. the separated anhydride contained from the beginning less than 0.02% phthalide. The yield increased during the first 3–4 days to more than 100%. The optimum saline bath temperature in the 200-tube furnace was around 370° C. In continuous operation the average monthly yield was 103–104%. Temperature changes within the range from 365–385° C. did not reduce the yield lastingly.

An identical catalyst which was made only with anatase (36 g.), yielded at 380° C. over one week only 20 to 30% yields. Although at 420° C. after 2 weeks yields of about 100% were still achieved, the product, with a phthalide content of more than 1%, was not suitable for processing into pure phthalic anhydride by normal operation. Only by increasing the coating quantity by the factor of 1.5, using 6 mm. carrier balls and reducing the vanadium pentoxide content to 4.5 g. per liter of carrier was it possible to obtain a useable anhydride at all. However, during the start-up period an inferior product was obtained even with catalysts changed in this manner. The addition of zirconium oxide or lithium salts as per Belgian Pat. No. 721,850 did not result in any noticeable improvement.

EXAMPLE 2

508 g. $NH_4VO_3$ were dissolved during heating and addition of 18 ml. of 28% aqueous ammonia in 13 liters water. Into the solution, heated to 90° C., 2.88 kg. of a titanyl sulfate solution (200 g. $TiO_2$ and 800 g. $H_2SO_4$ per liter) was stirred during 15 minutes. During another 15 minutes 1.4 liters of an aqueous ammonia solution was added until the mixture had a pH value of 2. A precipitate of light yellow color separated in the process. After stirring had continued at 90° C. for another 2 hours, the precipitate was syphoned off, suspended several times, centrifuged and dried. It contained vanadium pentoxide and titanium dioxide in the proportion of 1:1 by weight.

Catalyst: 16 g. mixed precipitation, 20 g. anatase, 4 g. titanium dioxide-hydrate. BET surface 18. The Debye- Scherrer diagrams of the tempered coating were identical with those of the catalyst described in Example 1. The catalyst was applied in a single tube furnace for 5 weeks. The average yield was 104% at 400° C. Phthalide content 0.08%.

EXAMPLE 3

Catalyst: 13 g. $V_2O_5$, 15 g. anatase, 15 g. titanium oxide-hydrate. BET surface 50.

The catalyst was started up in the single tube furnace at 380° C. and already on the second day it yielded a product with less than 0.02% phthalide and a yield of more than 100%. In the course of 10 days the yield reached 104%.

EXAMPLE 4

Catalyst: 8.7 g. $V_2O_5$, 26 g. anatase, 8.7 g. titanium oxide-hydrate, BET surface 30–35.

Various production batches of the catalyst were applied in a 10-tube furnace and several single tube furnaces. At a starting temperature of 360° C. a pure product was obtained right from the beginning. The yield reached 100% after 2 days. An average sample from 115 batches in the course of 3 months at 390° C. resulted in a yield of 106%. In order to examine the influence of pollution with iron oxide, finely ground rust from a technical furnace in a quantity of 0.3% referred to the coating was added to a batch. In the average of 3 weeks at 395° C. the yield was 105.3%. The same rust was added in the same quantity to a catalyst of the same chemical composition, which had been produced only with anatase (34.7 g.). The catalyst was rendered absolutely useless by this: at 420° C. the separated anhydride still contained 14% phthalide.

EXAMPLE 5

Catalyst: 8 g. $V_2O_5$, 25.6 g. anatase, 6.4 g. titanium dioxide-hydrate, BET surface 22.

At 390° C. a monthly average yield of 105.4% was obtained. Phthalide content of the separated anhydride 0.06%.

EXAMPLE 6

Catalyst: 9 g. $V_2O_5$, 14 g. anatase, 22 g. titanium dioxide-hydrate. BET surface 93.

At 375° C. a monthly average yield of 103.1% was obtained. Phthalide content of the separated anhydride 0.03%.

EXAMPLE 7

Catalyst: 9 g. $V_2O_5$, 36 g. anatase produced by tempering at 550° C., BET surface 52. At 360° C. an average yield of 102.6% was obtained.

EXAMPLE 8

Catalyst: 7 g. $V_2O_5$, 28 g. anatase produced by hydrolysis of titanium tetrachloride in the gaseous phase, BET surface 24. At 400 C. an average yield of 102.4% was obtained.

The term "BET" used herein refers to Ullmann, "Enzyklopädie der technischen Chemie," 1959, vol. 9 page 266 (Amer. Chem. Soc. 60, 309 [1938]).

The invention claimed is:

1. A catalyst for use in producing phthalic anhydride consisting of a carrier coated with a mixture of vanadium pentoxide, anatase having a BET surface of 7–11 sq.m./g. and titanium dioxide-hydrate having a BET surface greater than 100 sq.m./g.

2. A catalyst according to claim 1, the coating of which contains anatase and titanium dioxide-hydrate, in a proportion of 1 to 4:1 by weight in terms of the titanium dioxide in said anatase and titanium dioxide-hydrate.

References Cited

UNITED STATES PATENTS

| | | | |
|---|---|---|---|
| 2,035,606 | 3/1936 | Jaeger | 252—456 X |
| 3,464,930 | 9/1969 | Friedrichsen et al. | 252—461 X |
| 3,509,179 | 4/1970 | Friedrichsen et al. | 260—346.4 |

FOREIGN PATENTS

| | | | |
|---|---|---|---|
| 1,203,321 | 8/1970 | Great Britain | 252—461 |

DANIEL E. WYMAN, Primary Examiner

W. J. SHINE, Assistant Examiner

U.S. Cl. X.R.

260—346.4